(12) United States Patent
Hatanaka

(10) Patent No.: US 7,978,462 B2
(45) Date of Patent: Jul. 12, 2011

(54) ELECTRONIC APPARATUS

(75) Inventor: Hiroshi Hatanaka, Kobe (JP)

(73) Assignee: Fujitsu Ten Limited, Hyogo-ku, Kobe-shi (JP)

( * ) Notice: Subject to any disclaimer, the term of this patent is extended or adjusted under 35 U.S.C. 154(b) by 87 days.

(21) Appl. No.: 12/453,294

(22) Filed: May 6, 2009

(65) Prior Publication Data

US 2009/0279236 A1  Nov. 12, 2009

(30) Foreign Application Priority Data

May 9, 2008  (JP) ................ P2008-124066

(51) Int. Cl.
*H05K 5/00* (2006.01)
(52) U.S. Cl. ............ 361/679.01; 345/905; 248/917; 248/918; 248/919; 248/920; 349/58
(58) Field of Classification Search ........ 345/905, 345/204, 156, 157, 168, 169; 361/679.01–679.45, 361/679.55–679.59, 724–727; 248/917–924; 455/575.1, 575.4
See application file for complete search history.

(56) References Cited

U.S. PATENT DOCUMENTS

| 4,983,951 | A | * | 1/1991 | Igarashi et al. | 340/461 |
| 5,173,686 | A | * | 12/1992 | Fujihara | 345/87 |
| D391,251 | S | * | 2/1998 | Yuyama et al. | D14/132 |
| 6,816,177 | B2 | * | 11/2004 | Wang et al. | 345/156 |
| 6,972,944 | B2 | * | 12/2005 | Clapper | 361/679.08 |
| D532,399 | S | * | 11/2006 | Sogabe et al. | D14/132 |
| 7,593,002 | B2 | * | 9/2009 | Tak | 345/168 |
| 2006/0104013 | A1 | * | 5/2006 | Sakakibara et al. | 361/680 |
| 2007/0068366 | A1 | * | 3/2007 | Hamaoka et al. | 84/423 R |

FOREIGN PATENT DOCUMENTS

| JP | 03-273944 | 12/1991 |
| JP | 05-105003 | 4/1993 |
| JP | 07-320440 | 12/1995 |
| JP | 2004-007135 | 1/2004 |

* cited by examiner

*Primary Examiner* — Zachary M Pape
*Assistant Examiner* — Nidhi Desai
(74) *Attorney, Agent, or Firm* — Harness, Dickey & Pierce, P.L.C.

(57) ABSTRACT

An electronic apparatus includes an electronic apparatus main body and a movable body which is mounted in the electronic apparatus main body, with its predetermined direction-wise one end supported thereon, so as to be displaceable between an encased condition where one surface faces the electronic apparatus main body and an unfolded condition where one surface is exposed. The movable body has predetermined-directionally extending guide slot formed at each side face thereof in a direction perpendicular to the predetermined direction. The electronic main body has guide rails for guiding the movable body that are inserted into their respective guide slots under a condition where one surface of the movable body faces the electronic apparatus main body, and a pressing portion disposed at predetermined direction-wise other end of the movable body, which abuts against the electronic apparatus main body in the encased condition for pressing the movable body against the guide rails.

7 Claims, 3 Drawing Sheets

ELECTRONIC APPARATUS

BACKGROUND OF THE INVENTION

1. Field of the Invention

The present invention relates to an electronic apparatus composed of an electronic apparatus main body and a movable body which is mounted in the electronic apparatus main body.

2. Description of the Related Art

For example, in an electronic apparatus of conventional art having a display as a movable body, the display is adapted to be displaceable between a state of being encased in a cover, or equivalently an encased condition, and a state of being exposed from the cover, or equivalently an unfolded condition (for example, refer to Japanese Unexamined Patent Publication JP-A 3-273944 (1991)). The display, now in the encased condition, is caused to slide, with its display screen pointing downward, so as to jut out from the cover, and then undergoes angular displacement about an axis which is perpendicular to the direction in which the display slides so as to be brought into the unfolded condition.

In the foregoing electronic apparatus, a holding portion is secured to each of the right-hand and left-hand sides of the cover interiorly thereof. At the holding portion is disposed a square pipe-shaped first slider in a freely slidable manner. Disposed within the first slider is a slidable second slider in which is placed the display in an angularly movable manner. The holding portion is formed with a through hole into which is inserted a first ball. The first ball is pressed by a pressing portion, whereupon a part of the first ball juts out from the through hole toward the first slider and is abutted against the side face of the first slider. With the first ball kept pressed inwardly from both sides of the first slider by the pressing portion, the first slider can be prevented from rattling against the holding portion.

Moreover, the second slider has, at its bottom portion, a through hole into which is inserted a second ball. The second ball is pressed by a pressing portion, whereupon a part of the second ball juts out from the through hole toward the first slider and is abutted against the inner peripheral surface of the first slider. With the second ball kept pressed against the inside of the first slider by the pressing portion, the second slider can be prevented from rattling against the first slider.

According to the conventional art thus far described, although a backlash of the second slider against the cover body and a backlash of the second slider against the first slider as well can be prevented from occurring in the encased condition, it is impossible to prevent occurrence of a backlash of the display coupled to the second slider in an angularly movable manner. After all, the conventional construction, when mounted in a motor vehicle in particular, may give off an unusual sound ascribable to a backlash.

SUMMARY OF THE INVENTION

Accordingly, an object of the invention is to provide an electronic apparatus in which production of a backlash-induced unusual sound can be prevented in a movable-body encased condition where a movable body is encased in place.

An electronic apparatus of the invention comprises an electronic apparatus main body and a movable body. One end portion in a predetermined direction of the movable body is supported by the electronic apparatus main body. The movable body is mounted in the electronic apparatus so as to be displaceable between an encased condition where one surface portion of the movable body is opposed to the electronic apparatus main body and an unfolded condition where the one surface portion is exposed to the outside. In each of opposite side faces of the movable body in a direction perpendicular to the predetermined direction is formed a guide slot extending in the predetermined direction.

The electronic apparatus main body includes guide rail portions for guiding the movable body while the guide rail portions are inserted into their respective guide slots under a condition where the one surface portion of the movable body is opposed to the electronic apparatus main body.

A pressing portion is disposed in at least one of the other end portion of the movable body in the predetermined direction and that part of the electronic apparatus main body which is opposed to the other end portion of the movable body in the predetermined direction in the movable-body encased condition, the pressing portion being abutted against the electronic apparatus main body or the movable body in the movable-body encased condition, for pressing the movable body against the guide rail portions.

According to the invention, during a transition from the unfolded condition to the encased condition, the movable body is moved while allowing the guide rail portions to be inserted in their respective guide slots formed at both side faces thereof and keeping its one surface portion opposed to the electronic apparatus main body. In the movable-body encased condition, the pressing portion, which is disposed at least in one of the other end portion of the movable body in the predetermined direction and that part of the electronic apparatus main body which is opposed to the other end portion of the movable body in the predetermined direction in the movable-body encased condition, is abutted against the electronic apparatus main body or the movable body to press the free end portion of the movable body against the guide rail portions. In this way, the movable body is restrained from further movement, and thereby production of a backlash-induced unusual sound can be prevented in the movable-body encased condition. Moreover, since the pressing portion acts to press the other end portion of the movable body on which is supported the one end portion in the predetermined direction against the guide rail portions, it is possible to effectively prevent production of an unusual sound in the other end portion that is apt to rattle due to vibrations.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1A:
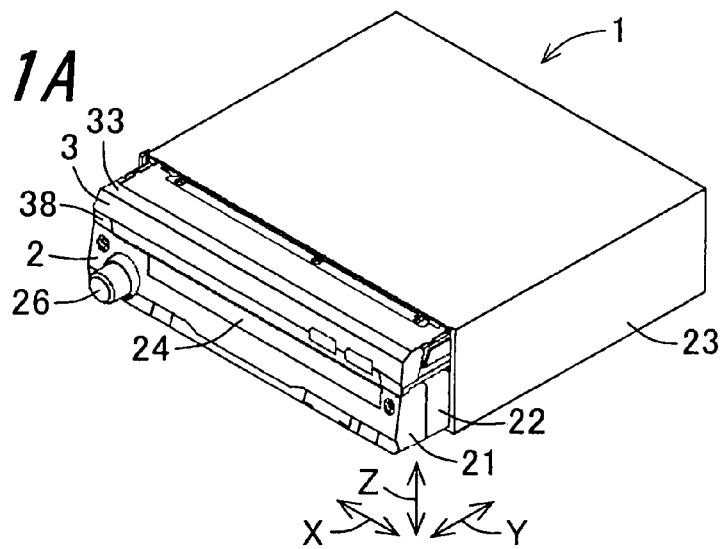
FIGS. 1A to 1C are perspective views showing part of the structure of a navigation system implemented by way of an electronic apparatus in accordance with an embodiment of the invention.

Now referring to the drawings, preferred embodiments of the invention will be described in detail.

Figure 1B:
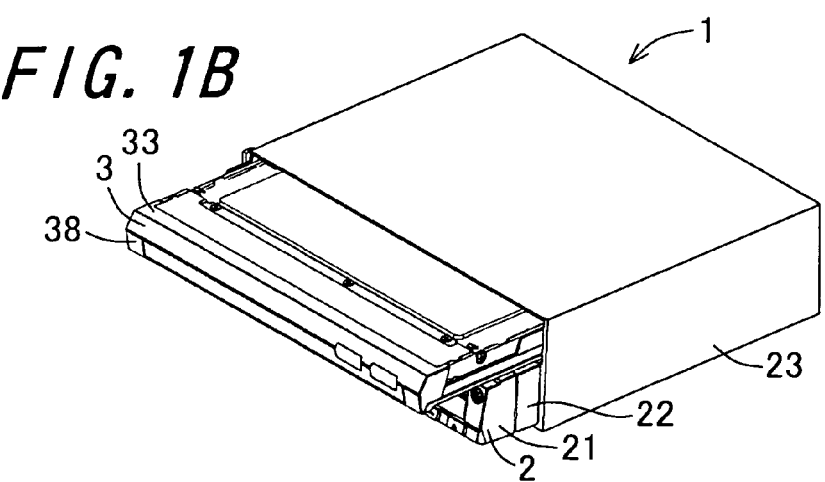
Figure 1C:
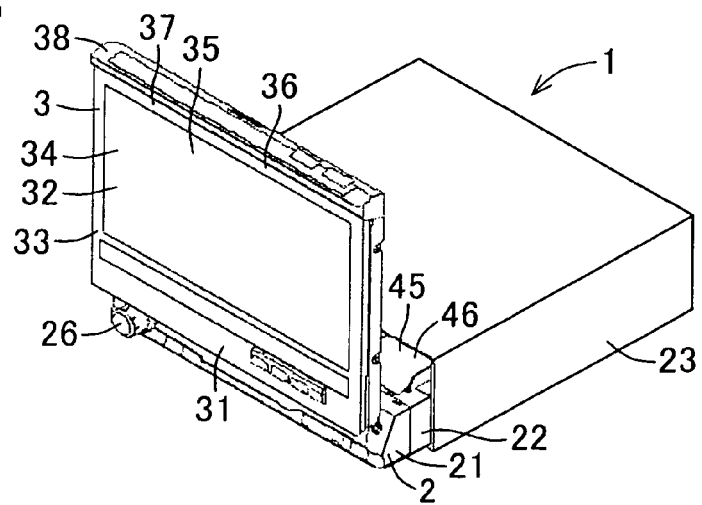

FIGS. 1A to 1C are perspective views showing part of the structure of a navigation system 1 implemented by way of an electronic apparatus in accordance with one embodiment of the invention. FIG. 1A shows a movable-body encased condition where a movable body 3 assumes an encased position, FIG. 1B shows a condition of transition where the movable body 3 assumes a position of transition between an encased condition and an unfolded condition, and FIG. 1C shows a movable-body unfolded condition where the movable body 3 assumes an unfolded position. The navigation system 1 is built as an in-dash type car navigation system which is installed in a dashboard of a motor vehicle. The navigation system 1 offers, in addition to a navigating capability, an audio capability, a motion-picture replay capability, and so forth.

The navigation system 1 comprises an electronic apparatus main body 2 and the movable body 3.

The electronic apparatus main body 2 includes a first casing 21 and a second casing 23 for supporting the first casing 21 in such a manner that one end portion 22 of the first casing 21 in a predetermined direction is exposed to the outside. The first casing 21 and the second casing 23 are each formed in substantially rectangular parallelepiped shape. The navigation system 1 is adapted to conform with the standard of 1DIN, that is, 180 mm in width, 50 mm in height, 200 mm in depth. For installation in a motor vehicle, the navigation system 1 is inserted into a 1DIN size-adaptable insertion hole formed in a dashboard of the motor vehicle. Note that, in the following description, the direction of the width of the electronic apparatus main body 2 is defined as the X direction, the aforementioned predetermined direction, or equivalently the direction of the depth of the electronic apparatus main body 2 is defined as the Y direction, and the direction of the height of the electronic apparatus main body 2 is defined as the Z direction.

The first casing 21 of the electronic apparatus main body 2 has, at its one end portion 22 in the Y direction, an opening portion 24 for the insertion and ejection of a recording medium. In this embodiment, the recording medium refers to a disc-shaped recording medium such as a CD (Compact Disc), a DVD (Digital Versatile Disc), and a BD (Blu-ray Disc). The opening portion 24 is formed at one end portion of the first casing 21 in the Z direction. In other words, with the navigation system set in place, the opening portion 24 is located at the upper end portion of the first casing 21 and opens into the side of one end of the first casing 21 in the Y direction. Disposed within the first casing 21 are: a reading/reproducing section including an optical pickup device, for reading and reproducing information recorded on a recording medium; a memory section for storing therein navigation information such as map data; and a navigation processing section for effecting route navigation on the basis of navigation information stored in the memory section or navigation information read out from the recording medium and information provided from a non-illustrated GPS (Global Positioning System) device. Moreover, in the area of one end portion 22 of the first casing 21 other than the area where the opening portion 24 is formed, there is disposed an operating section including a volume switch 26 for effecting input of various instructions as to the navigating capability and the audio capability or the motion-picture replay capability.

The movable body 3 is formed in the shape of a low-profile rectangular parallelepiped having a substantially rectangular shape in a plan view. The movable body 3 is mounted in the electronic apparatus main body 2 so as to be displaceable between a state of assuming an encased position, or equivalently an encased condition where its thicknesswise one surface portion 32 is opposed to the electronic apparatus main body 2, and a state of assuming an unfolded position, or equivalently an unfolded condition where the thicknesswise one surface portion 32 is exposed to the outside. The movable body 3 is, at its one end portion 31 in a predetermined direction which is perpendicular to the X direction and a direction perpendicular to the direction of the thickness of the movable body 3, supported by the electronic apparatus main body 2. In the movable-body encased condition, there is secured a gap between the electronic apparatus main body 2 and the movable body 3. The size of the gap in the Z direction is so selected as to avoid that the confronting parts of the electronic apparatus main body 2 and the movable body 3 make contact with each other due to vibrations in the movable-body encased condition. For example, the size of the gap in the Z direction is so selected as to fall in a range from 1.5 mm to 2 mm.

With the navigation system 1 set in place, the movable body 3 is located above the first casing 21; that is, it is located on the side of one surface of the first casing 21 in the Z direction. In the movable-body encased condition, the movable body 3 is encased, with the exclusion of a free end portion 38 which is the other end portion thereof in the predetermined direction, in the second casing 23. In the movable-body encased condition, the free end portion 38 of the movable body 3 faces the end portion of the electronic apparatus main body 2; that is, the free end portion 38 is opposed to one end portion 22 of the second casing 23.

The movable body 3 includes a third casing 33 and a display section 34. The display section 34 retained in the third casing 33 has a casing liquid crystal display panel and a touch panel formed so as to cover the liquid crystal display panel. In the area of one surface portion 32 of the movable body 3 other than the area where an outer edge 36 lies, a display screen 35 of the display section 34 is so disposed as to be exposed to the outside. The display screen 35 of the display section 34 is so formed as to be recessed inwardly relative to one surface 37 of the third casing 33. The display section 34 is electrically connected to the electronic apparatus main body 2 by way of a flexible wiring board.

The second casing 23 is provided with a displacing section 45 for effecting a displacement of the movable body 3. The displacing section 45 includes a slidingly displacing portion and an angularly displacing portion. The slidingly displacing portion allows the movable body 3 to be displaced in the Y direction under a condition where the one thicknesswise surface portion 32 of the movable body 3 is opposed to the electronic apparatus main body 2. The angularly displacing portion allows the movable body 3 to make angular displacement about an axis extending in a widthwise direction (the X direction) which is perpendicular to a direction in which the electronic apparatus main body 2 and the movable body 3 stack one upon another (the Z direction) and to a direction in which the movable body 3 is displaced by the slidingly displacing portion (the Y direction).

The displacing section 45 includes a holding portion 46 for holding one end portion 31 of the movable body 3 while allowing displacement in the X direction. The slidingly displacing portion is composed of a first motor and a first gear group disposed in the holding portion 46, and a rack gear which is disposed in the second casing 23 so as to extend in the Y direction and engages with the gear wheels of the first gear group to which is imparted power from the first motor. As the rotary shaft of the first motor is rotated, the first gear group is caused to turn, whereupon the gear wheels of the first gear group engage with the rack gear 47 thereby to displace the holding portion 46 in the Y direction. At this time, as shown in FIGS. 1A and 1B, the movable body 3 is moved in the Y direction.

The angularly displacing portion includes a second motor and a second gear group disposed in the holding portion 46, and a third gear secured to the movable body 3. The third gear, which is disposed coaxially with the axis about which the movable body 3 is angularly displaced, engages with the gear wheels of the second gear group. As the rotary shaft of the second motor is rotated, the second gear group is caused to turn, whereupon the gear wheels of the second gear group engage with the third gear. At this time, as shown in FIG. 1C, the movable body 3 is angularly displaced about the axis extending in the X direction.

Figure 2A:
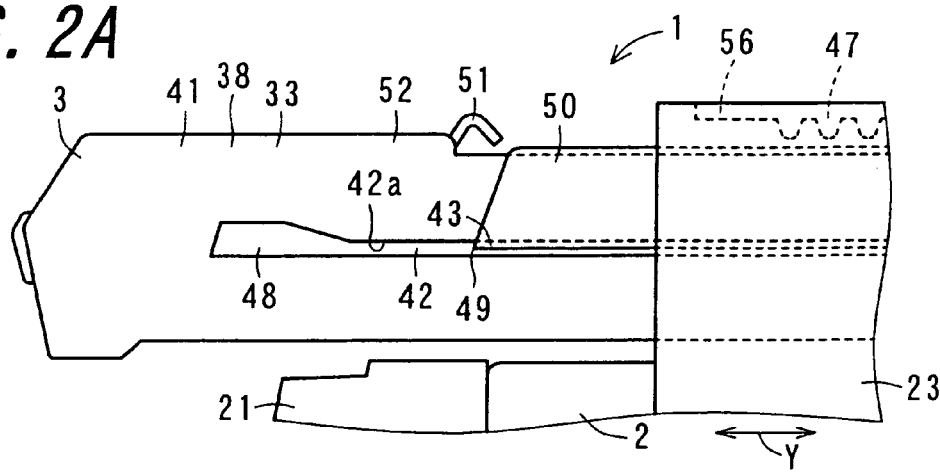
FIGS. 2A to 2C are enlarged side views showing the free end portion of the movable body and nearby areas.
Figure 2B:
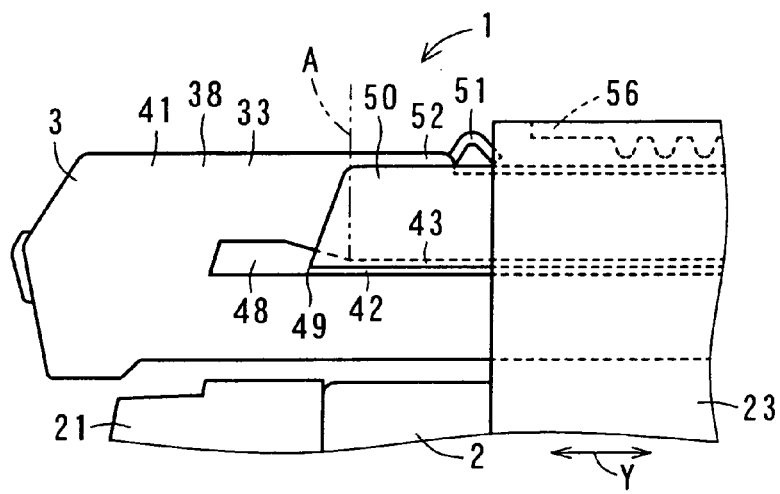
Figure 2C:
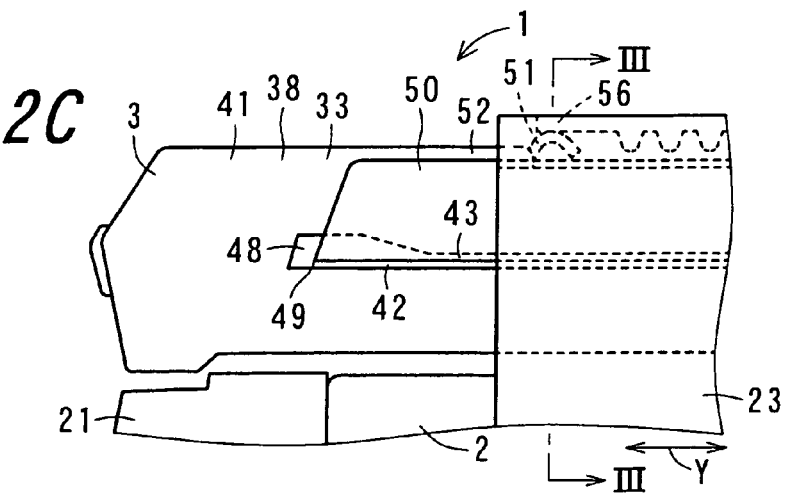
Figure 3:
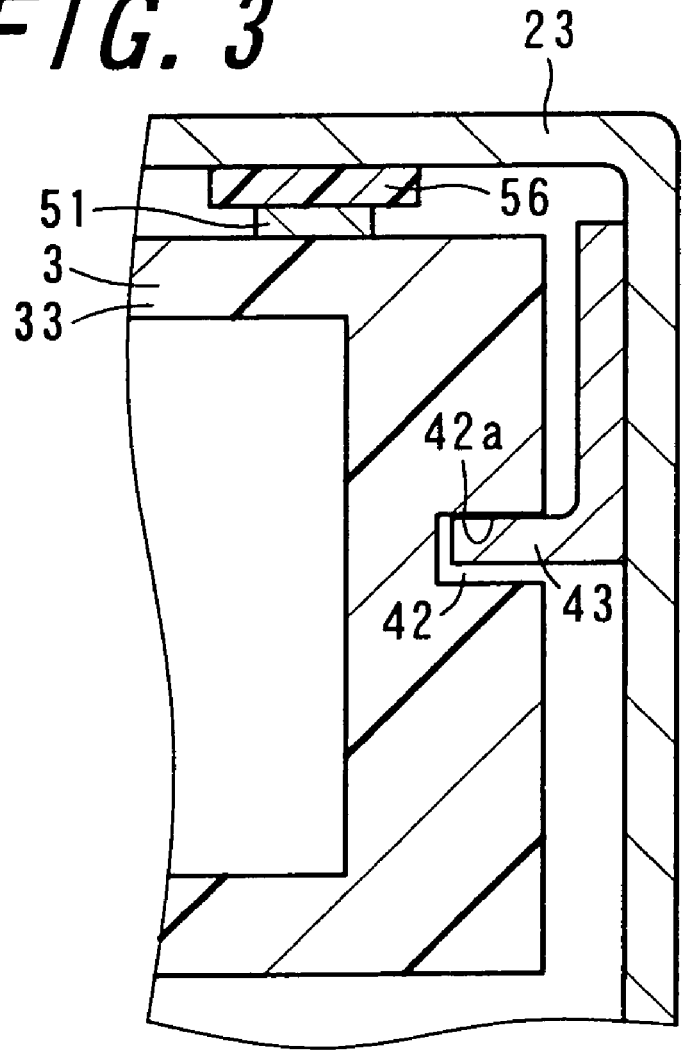
FIG. 3 is a sectional view taken along the section line III-III depicted in FIG. 2C.

FIGS. 2A to 2C are enlarged side views showing the free end portion 38 of the movable body 3 and nearby areas. FIGS. 2A and 2B show the condition of transition where the movable body 3 assumes a position of transition between the encased condition and the unfolded condition, and FIG. 2C shows the movable-body encased condition where the movable body 3 assumes the encased position. In addition, FIG. 3 is a sectional view taken along the section line III-III depicted in FIG. 2C.

In the movable body 3, on each of the opposite side faces 41 of the third casing 33 in the X direction, there is formed a guide slot 42 extending in the predetermined direction. The second casing 23 is formed with a guide rail portion 43 which is inserted into the guide slot 42. In the movable-body encased condition, the guide rail portion 43 is inserted in the guide slot 42. The movable body 3 is displaced in the Y direction by the slidingly displacing portion while being guided with a slot guideway 42a constituting the guide slot 42 kept in contact with the guide rail portion 43.

The guide rail portion 43 extends in parallel with the Y direction and is formed so as to protrude inwardly from the inner peripheral surface of the second casing 23 in the X direction. The guide rail portion 43 has its Y-directionally end 50 exposed from the second casing 23. The guide rail portion 43 is shaped like a plate extending straightly in the Y direction. The guide rail portion 43 is made of a metal steel plate such for example as a stainless steel plate. The width of the guide slot 42 in a direction perpendicular to the predetermined direction is set to be slightly larger than the thickness of the guide rail portion 43 which is inserted into the guide slot 42.

The other end portion 38 of the movable body 3 in the predetermined direction is formed with a pressing portion 51 which is kept in contact with the electronic apparatus main body 2 in the movable-body encased condition, for pressing the movable body 3 against the guide rail portion 43. In the movable-body encased condition, the pressing portion 51 is located on thicknesswise the other surface portion 52 of the movable body 3. The pressing portion 51 exhibits resiliency. To be more specific, the pressing portion 51 is formed of a leaf spring and has a substantially circularly arcuate sectional profile as seen in a direction perpendicular to the X direction. One end of the circularly arcuate part of the pressing portion 51 is formed integrally with a panel constituting part of the other surface portion 52 of the movable body 3. The pressing portion 51 is made of a metal material. For example, the pressing portion 51 is formed by processing an electrogalvanized steel plate into the desired configuration. Note that the pressing portion 51 makes contact with other members and thus there is a risk of abrasion. However, the electrogalvanized steel plate is excellent in abrasion resistance and is also impervious to discoloration caused by abrasion. Therefore, in the condition of transition where the movable body 3 assumes a position of transition between the encased condition and the unfolded condition, although the pressing portion 51 could be visually recognized by a user because of its location, it is unobtrusive to the user. While, in this construction, the pressing portion 51 is made of a metal material, a synthetic resin material, for example, polyacetal may be used instead for forming the pressing portion 51.

The pressing portion 51 is formed at each of the opposite end portions of the movable body 3 in the X direction. In the movable-body encased condition, the pressing portion 51 is located face to face with the inner peripheral surface of the second casing 23. Moreover, in the movable-body encased condition, that part of the second casing 23 which is confronted by the pressing portion 51 is formed with an abutment portion 56 against which the pressing portion 51 is abutted. The abutment portion 56 is made of a synthetic resin material such for example as polyacetal. On the inner peripheral surface of the upper part of the second casing 23 is formed the rack gear 47. The abutment portion 56 is formed integrally with the rack gear 47, more specifically, the abutment portion 56 merges with one end of the rack gear 47 in the Y direction. That is, when the rack gear 47 is attached to the second casing 23, the abutment portion 56 can also be attached to the second casing 23 at the same time. Hence it follows that the provision of the abutment portion 56 will not result in an undesirable increase in the number of assembly man-hours. Moreover, by forming the abutment portion 56 from a synthetic resin material, in the case where the pressing portion 51 is made of a metal material, it is possible to prevent production of a sliding sound caused by a sliding motion between the pressing portion 51 and the abutment portion 56. While the present embodiment is provided with the abutment portion 56, the abutment portion 56 does not necessarily have to be provided. In this case, the pressing portion 51 may be abutted directly against the inner peripheral surface of the second casing 23 in the movable-body encased condition.

Upon the pressing portion 51 being abutted against the surface of the abutment portion 56 confronted by the movable body 3 in the movable-body encased condition, the movable body 3 is pressed toward the second casing 23; that is, it is pressed downwardly, and the slot guideway 42a facing the guide slot 42 is pressed against the guide rail portion 43. In this way, the movable body 3 is restrained from further movement and is thus positioned securely relative to the second casing 23. This makes it possible to prevent production of a backlash-induced unusual sound. Moreover, the pressing portion 51 acts to press the other end portion 38 of the movable body 3 on which is supported one end portion 31 in the predetermined direction against the guide rail portion 43. This makes it possible to effectively prevent production of an unusual sound in the other end portion 38 that is apt to rattle due to vibrations. Accordingly, the navigation system 1 of the present embodiment succeeds in preventing production of an unusual sound ascribable to a backlash of the movable body 3 and is thus suitable for use in motor vehicles that are subjected to vibrations.

The guide slot 42 and the guide rail portion 43 are formed in such a manner that, in the movable-body encased condition, a gap can be secured between the movable body 3 and the first casing 21 even during the time the movable body 3 is pressed by the pressing portion 51. On one surface portion 32 of the movable body 3 is formed the display screen 35 which is visually identified by the user during the use of the navigation system 1. Even if the pressing portion 51 presses the movable body 3 and consequently one surface portion 32 of the movable body 3 comes close to make contact with the first casing 21, by virtue of the gap, there will be no risk of damage such as a flaw to that part of the movable body 3.

The guide slot 42 and the guide rail portion 43 as stated hereinabove are so designed that, when the movable body 3 is pressed by the pressing portion 51, one end 49 of the guide rail portion 43 in its extending direction is kept out of contact with the inner peripheral surface of the guide slot 42 facing one end 49 of the guide rail portion 43 with respect to the direction in which the movable body 3 is pressed by the pressing portion 51. To be more specific, one end portion 48 of the guide slot 42 in the predetermined direction is so formed as to widen in a direction opposite to the direction in which the movable body 3 is pressed by the pressing portion 51, and more specifically widen toward thicknesswise the other surface portion of the movable body 3.

As shown in FIG. 2B, after one end 49 of the guide rail portion 43 in the predetermined direction is inserted in a broad area 61 which is the area of the guide slot 42 having an increased slot width, and more specifically, after foregoing one end 49 of the guide rail portion 43 is displaced beyond a position A of one end of the broad area 61 in the predetermined direction toward the other end of the broad area 61 in the predetermined direction, then the movable body 3 is pressed by the pressing portion 51. In the absence of the broad area 61, when the movable body 3 is pressed by the pressing portion 51, one end 49 of the guide rail portion 43 in the predetermined direction may be brought into sliding contact with the guide slot 42, which leads to a risk of scraping away the slot guideway 42a facing the guide slot 42. Particularly in a case where that part of the movable body 3 in which is formed the guide slot 42 is made of a synthetic resin material and also the guide rail portion 43 is made of a metal material whose rigidity is higher than that of the synthetic resin material, the movable body 3 becomes more susceptible to scraping. In this regard, with the provision of the broad area 61, it is possible to protect the slot guideway 42a facing the guide slot 42 of the movable body 3 from scraping, and thereby allow the movable body 3 to displace smoothly without causing one end 49 of the guide rail portion 43 to be caught in the slot guideway 42a facing the guide slot 42.

In the movable-body unfolded condition, as well as during a transition between the movable-body unfolded condition and the movable-body encased condition, when the pressing portion 51 is kept out of contact with the abutment portion 56, the load on the foregoing first motor is the same as in a pressing portion 51-free construction. Moreover, during a transition from the movable-body encased condition to the movable-body unfolded condition and during a transition from the movable-body unfolded condition to the movable-body encased condition as well, when the pressing portion 51 is kept in contact with the abutment portion 56, inconveniently, the load on the foregoing first motor is increased as compared with the pressing portion 51-free construction. However, even in the absence of the pressing portion 51, the first motor needs to be driven under a high load at the time of actuation and deactuation. Therefore, even if the pressing portion 51 is provided so that the movable body 3 is put under a pressing force, it is possible to prevent the passage of electric current greater than rated current through the first motor.

While, in the present embodiment, the movable body 3 is provided with the pressing portion 51, by way of another embodiment of the invention, the pressing portion 51 may be disposed in that part of the electronic apparatus main body 2 which is opposed to the free end portion 38 of the movable body 3 in the movable-body encased condition. In this case, instead of the abutment portion 56, the pressing portion 51 is disposed at the position of the second casing 23 at which the abutment portion 56 is originally disposed. Moreover, in order for the movable body 3 to abut against the pressing portion 51 at its free end portion 38, that part of the movable body 3 which is opposed to the pressing portion 51 during a displacement in the Y direction may be made thinner than the other remaining part of the movable body 3, or that part of the free end portion 38 of the movable body 3 which is contacted by the pressing portion 51 in the movable-body encased condition may be made thicker than the other remaining part of the free end portion 38. In so doing the pressing portion 51 can be kept out of contact with the movable body 3 until the free end portion 38 of the movable body 3 reaches the encased position. In this case, it is possible to form the abutment portion 56 in that part of the free end portion 38 of the movable body 3 which is contacted by the pressing portion 51 in the movable-body encased condition.

Moreover, by way of still another embodiment of the invention, the pressing portion 51 may be disposed on one end portion 22 of the first casing 21 in the Y direction. In this case, in the movable-body encased condition, the movable body 3 is kept pressed upwardly; that is, it is kept pressed in a direction away from the first casing 21 with respect to the Z direction. Alternatively, the pressing portion 51 may be disposed on one surface portion 32 at the other end portion 38 of the movable body 3 in the predetermined direction. In this case, the movable body 3 is kept pressed upwardly in the movable-body encased condition.

Further, while, in the embodiments thus far described, the display section 34 is disposed in the movable body 3, the movable body 3 may be provided with an input switch for issuing input signals to the electronic apparatus main body 2 instead of the display section 34. In this case, a switch piece of the input switch is so formed as to be exposed from thicknesswise one surface portion 32 of the third casing 33. In addition, the movable body 3 may be provided with an electronic device which is connected to the electronic apparatus main body 2. Even with the installation of any type of electronic components, it is possible to achieve the same effects as achieved in the foregoing embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus, comprising:
   an electronic apparatus main body; and
   a movable body of which one end portion in a predetermined direction of the movable body is supported by the electronic apparatus main body, and which is mounted in the electronic apparatus so as to be displaceable between an encased condition where one surface portion of the movable body is opposed to the electronic apparatus main body and an unfolded condition where the one surface portion is exposed to the outside, in each of opposite side faces of the movable body in a direction perpendicular to the predetermined direction being formed a guide slot extending in the predetermined direction,
   wherein the electronic apparatus main body includes guide rail portions for guiding the movable body while the guide rail portions are inserted into their respective guide slots under a condition where the one surface portion of the movable body is opposed to the electronic apparatus main body, and
   wherein a pressing portion is disposed in at least one of the other end portion of the movable body in the predetermined direction and that part of the electronic apparatus main body which is opposed to the other end portion of the movable body in the predetermined direction in the movable-body encased condition, the pressing portion being abutted against the electronic apparatus main body or the movable body in the movable-body encased condition, for pressing the movable body downwardly so that a slot guideway facing the guide slot is pressed against the guide rail portion.

2. The electronic apparatus of claim 1, wherein the guide slot and the guide rail portion are so formed that, when the movable body is pressed by the pressing portion, one end of the guide rail portion in its extending direction is kept out of contact with an inner peripheral surface of the guide slot facing the one end of the guide rail portion with respect to a direction in which the movable body is pressed by the pressing portion.

3. The electronic apparatus of claim 2, wherein one end portion of the guide slot is so formed as to widen in a direction opposite to the direction in which the movable body is pressed by the pressing portion.

4. The electronic apparatus of claim 1, wherein the pressing portion is resilient.

5. The electronic apparatus of claim 1, wherein at least one of the pressing portion and that part of the electronic apparatus main body or the movable body which is abutted against the pressing portion is made of a synthetic resin material.

6. The electronic apparatus of claim 1, wherein that part of the movable body in which is formed the guide slot is made of a synthetic resin material, and
the guide rail portion is made of a metal material whose rigidity is higher than that of the synthetic resin material.

7. The electronic apparatus of claim 1, wherein the electronic apparatus main body includes:
a slidingly displacing portion for allowing the movable body to be displaced along the guide rail portion; and
an angularly displacing portion for allowing the movable body to make angular displacement about an axis extending in a widthwise direction which is perpendicular to a direction in which the electronic apparatus main body and the movable body stack one upon another and to a direction in which the movable body is displaced by the slidingly displacing portion in the movable-body encased condition.

* * * * *